May 18, 1937. M. PIRANI ET AL 2,080,899
METHOD AND APPARATUS FOR MOLDING GLASS TUBING
Filed May 4, 1932 2 Sheets-Sheet 1

INVENTORS
Marcello Pirani
Adolf Fehse
BY Charles E. Mullen
ATTORNEY

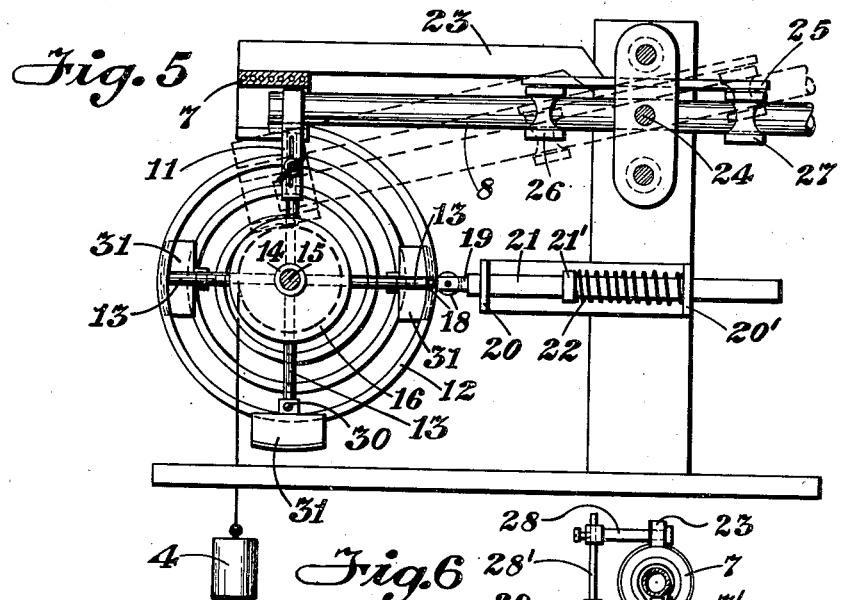

Patented May 18, 1937

2,080,899

UNITED STATES PATENT OFFICE 2,080,899

METHOD AND APPARATUS FOR MOLDING GLASS TUBING

Marcello Pirani, Berlin-Wilmersdorf, and Adolf Fehse, Berlin, Germany, assignors to General Electric Company, a corporation of New York Application May 4, 1932, Serial No. 609,218
In Germany May 6, 1931

4 Claims. (Cl. 49—7)

The present invention relates to electric discharge devices generally and more particularly the invention relates to methods and means for manufacturing tubular containers for luminous electric discharge devices.

It is frequently desirable to have the tubular container of a luminous electric discharge device in other than a linear shape. It has been the practice in the art heretofore to bend such tubes into desired shapes by hand, an inaccurate, slow and expensive method and one in which the highest degree of skill produced inaccurate and imperfect results.

The object of the present invention is to provide a method and a means for forming the linear, longitudinal, cylindrical glass containers of luminous electric discharge devices into desired shapes. Another object of the invention is to provide automatic means for shaping the linear, cylindrical, tubular containers of luminous electric discharge devices. A further object of the invention is to bend glass tubes, or rods into desired shapes by automatic means. Still further objects and advantages attaching to the invention and to its use and operation will be apparent to those skilled in the art from the following particular description and from the appended claims.

In accordance with these objects the invention comprises the steps of clamping one end of the longitudinal, cylindrical container to a form, or model of desired shape, which is adapted for rotational movement and is actuated by a suitable means. An oven is provided to heat said container at that part thereof along its length tangent to said form. As soon as that tangent part of said container is heated to its softening temperature, with a resultant decrease in its resistance to bending, said form is rotated by said means to bring a new part of said container into said oven, the heated part of said tube conforming to the curved contour of said form. This process is continued until the entire container is in the shape desired.

In the drawings accompanying and forming part of this specification several embodiments of the invention are illustrated in which Fig. 1 is a front elevational view partly in section of one embodiment of the invention.

Fig. 5 is a front elevational view of another embodiment of the invention.

Fig. 6 is a side elevational view of the embodiment shown in Fig. 5.

Fig. 7 is a top view of a part of the embodiment illustrated in Fig. 5.

Fig. 8 is a front elevational view, partly in section of another embodiment of our invention, and Fig. 9 is a side elevational view of the embodiment of the invention shown in Fig. 8.

Like numbers denote like parts in all views of the device.

Figure 1:
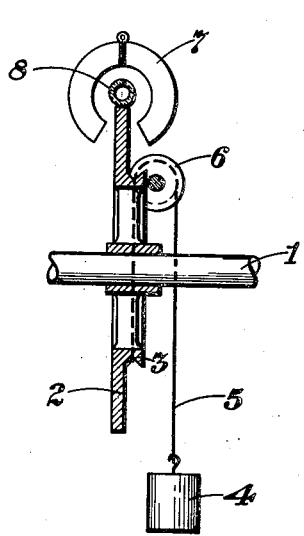
Figure 2:
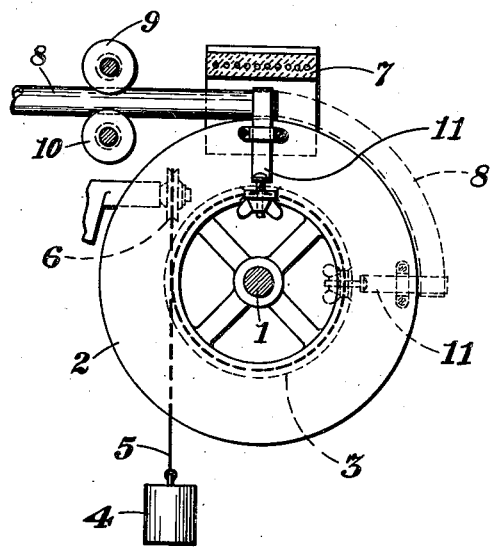
Fig. 2 is a side elevational view of the same embodiment of the invention shown in Fig. 1.

Referring to Figs. 1 and 2 of the drawings the device illustrated thereby is adapted to bend a longitudinal, cylindrical glass tube 8 into the shape of a circle or a part of a circle as desired. The device comprises a wheel 2 mounted on an axle 1 which is adapted for rotational movement. Said wheel 2 has a grooved part 3 which is of smaller diameter than the perimeter of said wheel 2. A weight 4 attached to a cord 5 is provided to rotate said wheel 2, said cord 5 being led over pulley 6 and wound around said grooved part 3 of said wheel 2. An electric oven 7 is arranged to heat that part of longitudinal glass tube 8 tangent to the perimeter of said wheel 2. Said glass tube 8 is held in position and guided into oven 7 and onto wheel 2 by rolls 9 and 10. One end of glass tube 8 is fastened to the rim of said wheel 2 by clamp 11.

After the end of said glass tube 8 has been clamped in position on said wheel 2 cord 5 is wrapped at least once around the grooved part 3 so as to cause said wheel 2 to revolve. The physical resistance of that part of glass tube 8 tangent to the perimeter of said wheel 2 and in oven 7 is at first sufficient to prevent the rotation of wheel 2, but as soon as that part of glass tube 8 in said oven 7 has been softened the resistance of that part of said tube 8 is diminished to a point where the force exerted by weight 4 on wheel 2 is sufficient to rotate said wheel 2. Said tube 8 is thus drawn gradually through the oven 7 and follows the contour of the wheel 2 to assume the shape of a circle or a part of a circle as desired.

The speed of rotation of said wheel 2 is determined by the rate at which that part of glass tube 8 in said oven 7 softens sufficiently to be bent with safety. This softening process is as fast as desired but we have found it desirable that the softening process take place rather slowly to avoid as much as possible the building up of strains in the heated part of glass tube 8. The movement is slow but continuous and said glass tube 8 is automatically formed in the desired shape.

Figure 3:
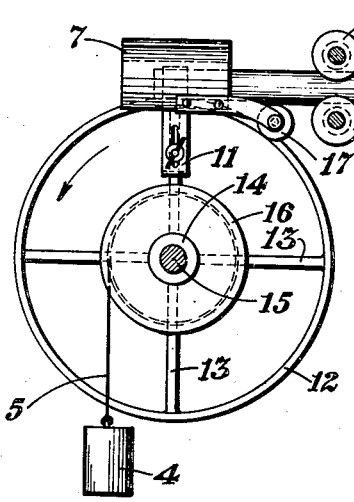
Fig. 3 is a front elevational view of another embodiment of the invention.
Figure 4:
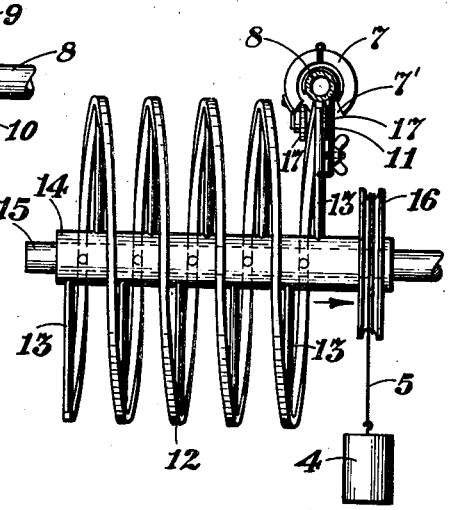
Fig. 4 is a side elevational view of the same embodiment shown in Fig. 3.

Another embodiment of the invention is shown in Figs. 3 and 4 in which the mold 12 is a helix supported by rods 13 set into axle part 14. Said axle part 14 is adapted to rotate about axle part 15 actuated by weight 4 supported by cord 5 led around pulley 16 attached to said axle part 14. Guide wheels 17 attached to oven 7 serve to direct mold 12 through said oven 7 and thus when said mold 12 is revolved by the force exerted by weight 4 axle part 14 slides horizontally along axle part 15 in the direction indicated by the arrow shown in Fig. 4.

The end of glass tube 8 is attached to the mold 12 by clamp 11 and said tube 8 softened by oven 7 follows said mold 12 when the resistance of that part of said tube 8 in oven 7 is diminished to that point at which the force exerted by weight 4 is sufficient to overcome it and to cause said mold 12 to rotate and said tube 8 gradually assumes the shape of a helix. After the tube 8 has assumed its helical shape and has cooled it is removed from said mold 12 by slipping said tube 8 off said mold 12 and then revolving said mold 12 in the reverse direction to that in which it was revolved when said tube 8 was formed.

In the embodiment of the invention shown in Figs. 5, 6 and 7 the mold 12 is a cone shaped spiral. In this embodiment form 12 is guided by rolls 18 attached to forked part 19 of arm 21 as shown in Figs. 5 and 7. Said arm 21 is supported by part 20 and is adapted for horizontal movement therein. Said rolls 18 are maintained in operative position to mold 12 by spring 22 pressing against part 20 and part 21' of arm 21.

Oven 7 is attached to arm 23 which is in turn attached to part 25 having hollow circular parts 26 which have the same median line as oven 7 and said parts 26 are adapted to support said tube 8 and guide said tube 8 into oven 7 and onto said mold 12. Said part 25 pivots around bolt 24 when oven 7 moves from its highest position to its lowest position (shown in dotted lines in Fig. 5). Oven 7 is guided in its vertical movements by arms 28 and 28' attached thereto and roller 29 resting on the convolution of mold 12 preceding that convolution over which oven 7 is situated. Supports 31 are attached to arms 13 by bolts 30 as shown in Figs. 5 and 6. Said supports 31 serve to maintain said tube 8 on mold 12. The structure and operation of the device is in other respects similar to that described in connection with Figs. 3 and 4. The finished tube 8 is removed from said mold 12 by loosening nuts 30 to remove guides 31 and slipping said finished tube 8 from mold 12.

In the embodiment of the invention shown in Figs. 8 and 9 the mold 32 is oval in shape and the sides thereof are provided with grooves 33 adapted to accommodate and frictionally engage rolls 35 and 36. When desired said parts 33 and 35 and 36 are teethed. Rolls 35 and 36 are attached to shafts 38 and 40 respectively and shaft 38 is revolved by pulley 39 actuated by cord 5 wrapped around said pulley 39 and led over pulley 43 and attached to weight 4. Said shaft 40 is driven through gear 41 engaging with gear 42 mounted on shaft 38. Said shafts 38 and 40 are led through support arm 37. Oven 7 is supported over tube 8 by arm 44. The operation of the device in other respects is similar to that described in the discussion of Figs. 3 and 4.

Each of the above described apparatuses is, when desired, wholly enclosed in an oven to reduce the building-up of strains in said glass tube 8 by reducing the temperature thereof gradually and when desired the speed of the apparatus is increased by heating by means well known in the art that part of glass tube 8 out of oven 7 and out of contact with the mold to a temperaure slightly less than the softening temperature of said glass tube 8. The various molds described are, when desired, actuated by other means than that shown and described, for example, a spring may be used in place of weight 4 or said tube 8 may be pushed through said oven 7 and onto said molds. When it is desired to reduce or eliminate the pulling force on the softened part of said tube 8 necessary to move the remainder of said tube 8, said tube 8 is pushed forward by means of gears connected to the revolving axle part of the mold and at a speed in proportion to the speed of rotation of said mold.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention.

What we claim as new and desire to secure by Letters Patent of the United States is:—

1. A machine for molding glass tubing comprising an oven, a mold, said oven being in operative relation to the glass tubing at that part of said tube tangent to said mold and adapted to heat said glass tubing to its softening temperature, said tube being fastened to said mold, said mold being adapted for rotational movement, means for exerting an invariable force to rotate said mold and means to support that part of said tubing out of contact with said mold, said last mentioned means permitting the movement of said tubing only in a direction toward said mold.

2. A machine for molding glass tubing comprising an oven, a mold, said oven being in operative relation to the glass tubing at that part of said tube tangent to said mold and adapted to heat said glass tubing to its softening temperature, said tube being fastened to said mold, said mold being adapted for rotational movement, means for exerting an invariable force to rotate said mold at a rate which is controlled by the softening of said glass tubing and means to support that part of said tubing out of contact with said mold, said last mentioned means permitting the movement of said tubing only in a direction toward said mold.

3. A machine for molding glass tubing comprising an oven, a mold, said oven being in operative relation to the glass tubing at that part of said tube tangent to said mold and adapted to heat said glass tubing to its softening temperature, said mold being adapted for rotational movement, and means for applying an invariable bending moment to said tubing.

4. The method of bending glass tubing to a desired shape which consists in passing said tubing through a heating means to soften said tubing, applying an invariable bending moment to the softened portion of said tubing, and balancing the decreasing resistance to bending of said softened tubing against said moment to determine the rate at which said tubing is passed through said heater and bent to the desired shape.

MARCELLO PIRANI.
ADOLF FEHSE.